US006311997B1

United States Patent
Lepley

(12) United States Patent
(10) Patent No.: US 6,311,997 B1
(45) Date of Patent: Nov. 6, 2001

(54) SIDECAR ASSEMBLY FOR A BICYCLE

(76) Inventor: Joël Lepley, 4423 Dumas, Pierrefonds, Quebec (CA), H9A 2T7

(*) Notice: Subject to any disclaimer, the term of this patent is extended or adjusted under 35 U.S.C. 154(b) by 0 days.

(21) Appl. No.: 09/641,940

(22) Filed: Aug. 21, 2000

(30) Foreign Application Priority Data

Sep. 13, 1999 (CA) .................................................. 2282150

(51) Int. Cl.⁷ .................................................. B62K 27/00
(52) U.S. Cl. ...................................... 280/203; 280/288.4
(58) Field of Search ............................. 280/203, 288.4, 280/62, 202, 473, 282

(56) References Cited

U.S. PATENT DOCUMENTS

| 317,337 | 5/1885 | Kirk . | |
|---|---|---|---|
| 1,172,995 | * 2/1916 | Hunter | 280/203 |
| 1,824,675 | 9/1931 | Linn . | |
| 1,848,451 | 3/1932 | Wishart . | |
| 2,485,994 | 10/1949 | Warner . | |
| 4,022,483 | * 5/1977 | Wallick et al. | 280/203 |
| 4,073,503 | * 2/1978 | Hokans | 280/203 |
| 4,229,018 | * 10/1980 | Chika | 280/203 |
| 4,254,965 | * 3/1981 | Kobel | 280/203 |
| 4,350,359 | 9/1982 | Van Gompel . | |
| 5,248,158 | 9/1993 | Ellard . | |
| 5,292,142 | 3/1994 | Vitarelli . | |
| 5,297,808 | 3/1994 | Ellard . | |

FOREIGN PATENT DOCUMENTS

| 17317 | * 5/1913 | (DK) | 280/203 |
|---|---|---|---|
| 17560 | * of 1904 | (GB) | 280/203 |
| 3052 | * 5/1913 | (NL) | 280/203 |
| 449616 | * 5/1913 | (IT) | 280/203 |
| 41514 | * 9/1937 | (NL) | 280/203 |

* cited by examiner

Primary Examiner—Daniel G. DePumpo
(74) Attorney, Agent, or Firm—Swabey Ogilvy Renault; Robert Mitchell

(57) ABSTRACT

A sidecar for a bicycle comprises a wheeled frame formed of a single U-shaped tube adapted to be readily attached to a bottom portion of the bicycle frame via a single bracket. The bracket includes an elongated horizontal portion projecting forwardly of the power train of the bicycle for slidably receiving thereon a first end portion of the U-shaped tube. A circumferential slot is defined in the first end portion of the tube for receiving a pin rigidly secured to the elongated portion of the bracket, thereby allowing limited rotational movements of the bicycle frame relative to the sidecar.

18 Claims, 6 Drawing Sheets

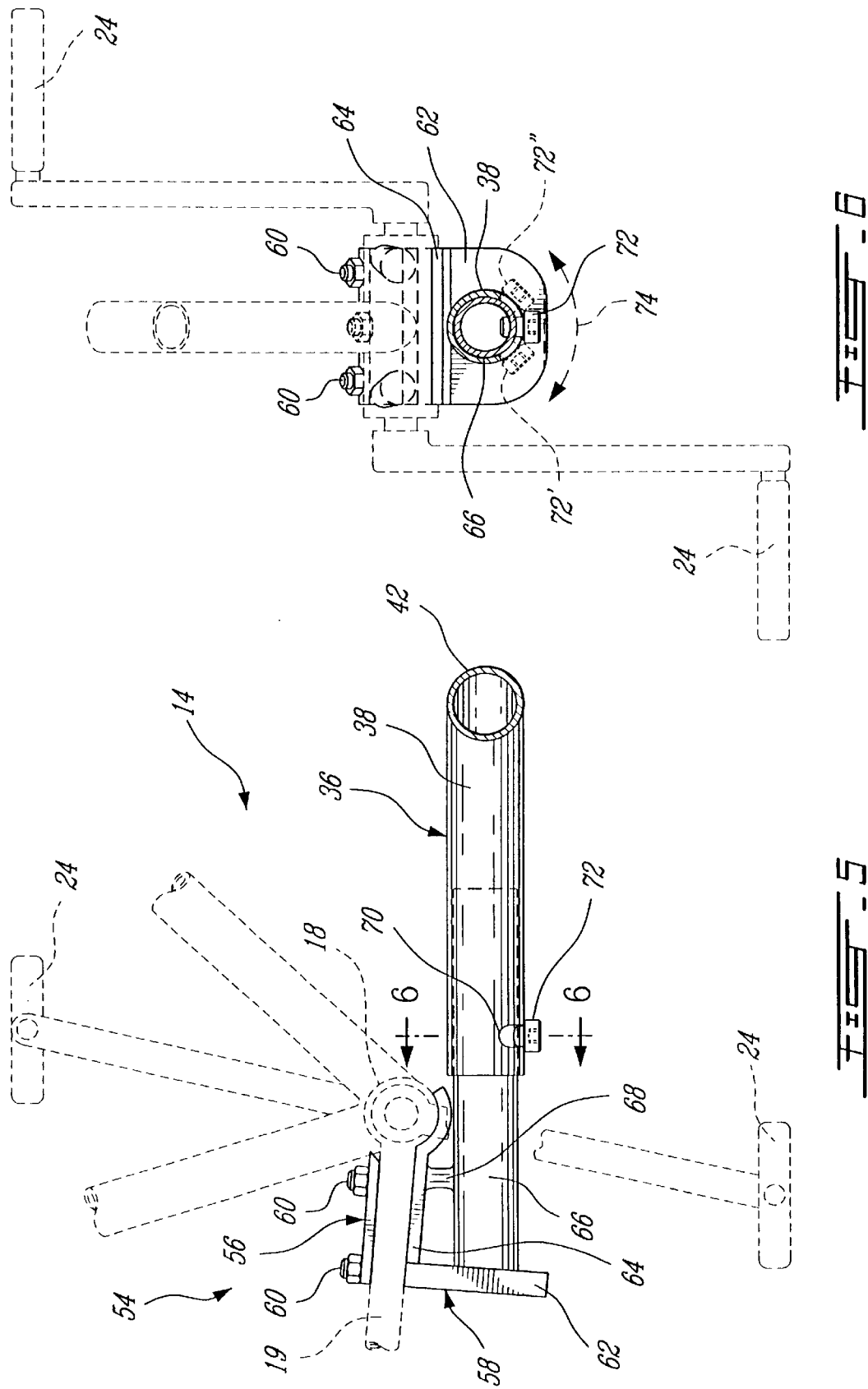

SIDECAR ASSEMBLY FOR A BICYCLE

BACKGROUND OF THE INVENTION

1. Field of the Invention

The present invention relates to sidecars for bicycles and, more particularly, pertains to a new sidecar assembly adapted to be readily attached and detached from a bicycle frame.

2. Description of the Prior Art

Over the years various carrying devices have been developed for carrying infants and small children on bicycles. For instance, it has been proposed to carry infants on child bicycle seats installed over the rear wheel of the bicycles or, alternatively, in small trailers drawn behind the bicycles. One drawback of such carrying devices resides in the fact that the cyclist cannot view and easily communicate with the child while riding the bicycle.

Accordingly, efforts have been made to design sidecars which are specifically adapted for use with bicycles. For instance, U.S. Pat. No. 5,248,158 issued on September 1993 to Ellard and U.S. Pat. No. 5,292,142 issued on Mar. 8, 1994 to Vitarelli both disclose a sidecar having a frame structure adapted to be attached to a bicycle frame by means of a number of interconnected swivel connections defining a parallelogram-like structural arrangement allowing the cyclist to lean the bicycle on either side when making turns. Typically, the sidecar is attached to the rear axle, the down tube and the crossbar of the bicycle so as to ensure that the attachment of the sidecar with the bicycle frame does not interfere with the operation of the power train of the bicycle.

Although the sidecars described in the above mentioned patents allow for the bicycle to lean on either side, it has been found that there is a need for a new and simpler sidecar which can be readily connected with and disconnected from a bicycle frame while still allowing limited relative motion therebetween.

SUMMARY OF THE INVENTION

It is therefore an aim of the present invention to provide a sidecar which is adapted to be easily and quickly connected with and disconnected from a bicycle frame.

It is also an aim of the present invention to provide such a sidecar which is relatively simple and economical to manufacture.

Therefore, in accordance with a general aspect of the present invention, there is provided a sidecar for a bicycle having a bicycle frame extending in a plane and defining a bottom axle housing for supporting a power train, comprising a wheeled frame adapted to extend on one side of the bicycle, a seat provided on the wheeled frame, and a coupling for attaching the wheeled frame to a bottom portion of the bicycle frame while allowing relative pivotal movements of the bicycle frame relative to the wheeled frame about a longitudinal axis of the bicycle. The coupling includes a first part which is fixed relative to the bicycle frame and a second part which is fixed relative to the wheeled frame. The first and second parts are rotatably interconnectable to form with the wheeled frame a system having one degree of freedom.

In accordance with a further general aspect of the present invention, there is provided a sidecar for a bicycle having a bicycle frame extending in a plane and defining a bottom axle housing for supporting a power train. The sidecar comprises a frame structure supporting a seat and having a wheel journaled thereto. The sidecar also comprises bracket means adapted to be mounted to a bottom portion of the bicycle frame for providing a connecting axis extending forwardly in a direction parallel to a longitudinal axis of the bicycle. The frame structure includes a structural member having a first end portion adapted to be slid along the connecting axis for interlocking engagement with the bracket means for solely allowing limited rotational movements of the bicycle frame relative to the frame structure about the longitudinal axis of the bicycle.

BRIEF DESCRIPTION OF THE DRAWINGS

Having thus generally described the nature of the invention, reference will now be made to the accompanying drawings, showing by way of illustration a preferred embodiment thereof, and in which:

FIG. 5 is an enlarged fragmentary side view of the connection between the sidecar and the bicycle; and FIG. 6 is a cross-sectional view taken along line 6—6 in FIG. 5.

DESCRIPTION OF THE PREFERRED EMBODIMENTS

Figure 1:
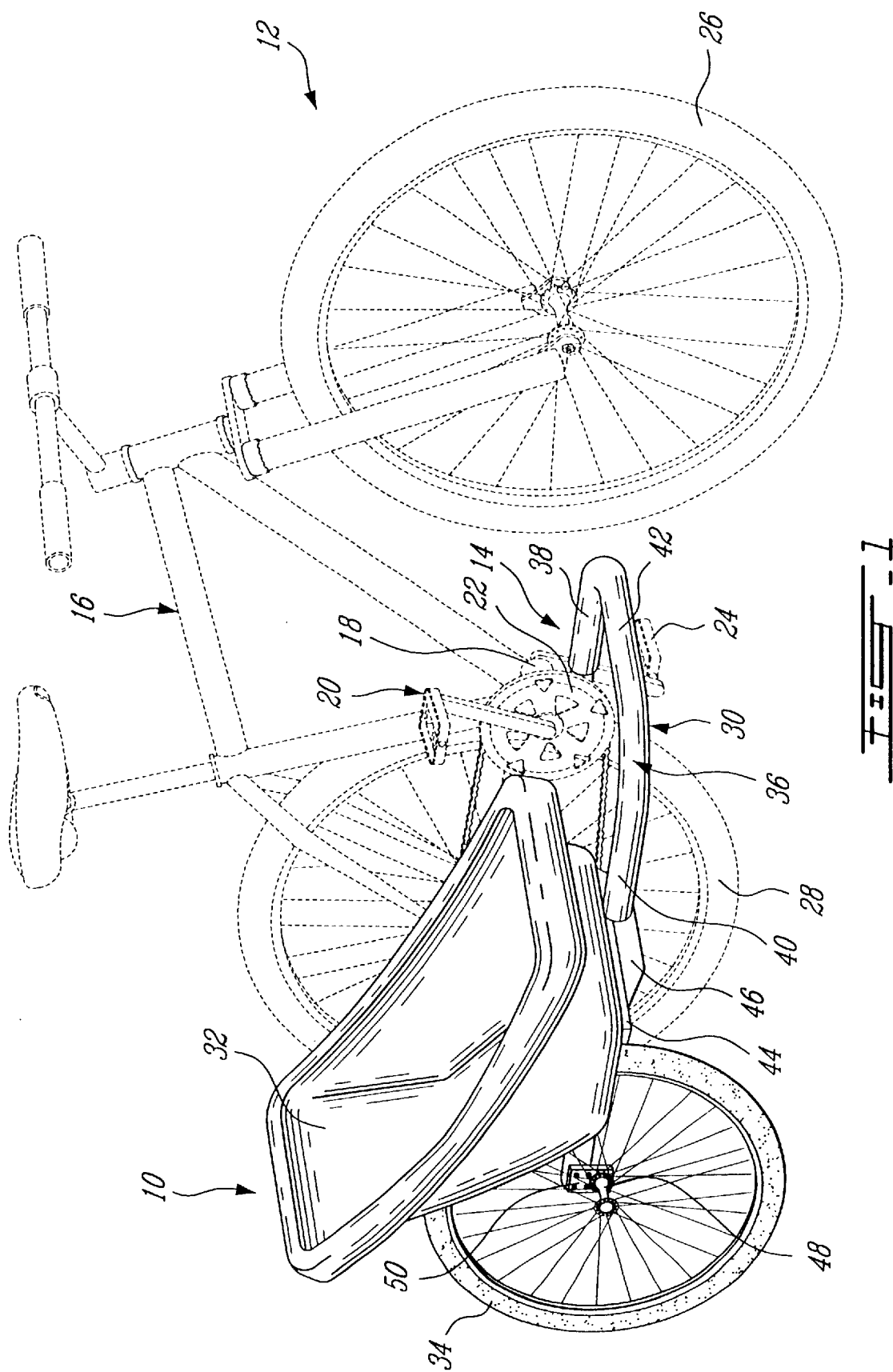
FIG. 1 is a perspective view of a sidecar attached to a bottom portion of a bicycle in accordance with a first embodiment of the present invention.

Preferring now the FIG. 1, there is shown a sidecar 10 attached to a side of a bicycle 12 via a single coupling 14. The bicycle 12 is of conventional construction and comprises among other elements a frame 16 defining a bottom axle housing 18 from which a pair of laterally spaced-apart chain stays 19 extend rearwardly. The bottom axle housing 18 is adapted to support a power train 20 including a chain sprocket 22 which can be operated via a pair of pedals 24 to propel the bicycle 10, as is well known in the art. The bicycle frame 16 is supported on the ground by front and rear wheels 26 and 28.

The sidecar 10 generally comprises a frame 30, a seat 32 rigidly mounted on the frame 30, and a wheel 34 journaled to the rear end of the frame 30. The seat 32 is generally centered over the wheel 34.

The frame 30 is composed of a single support or structural member 36 provided in the form of a U-shaped tube. The structural member 36 comprises first and second parallel linear portions 38 and 40 interconnected by a laterally bent portion 42.

Figure 2:
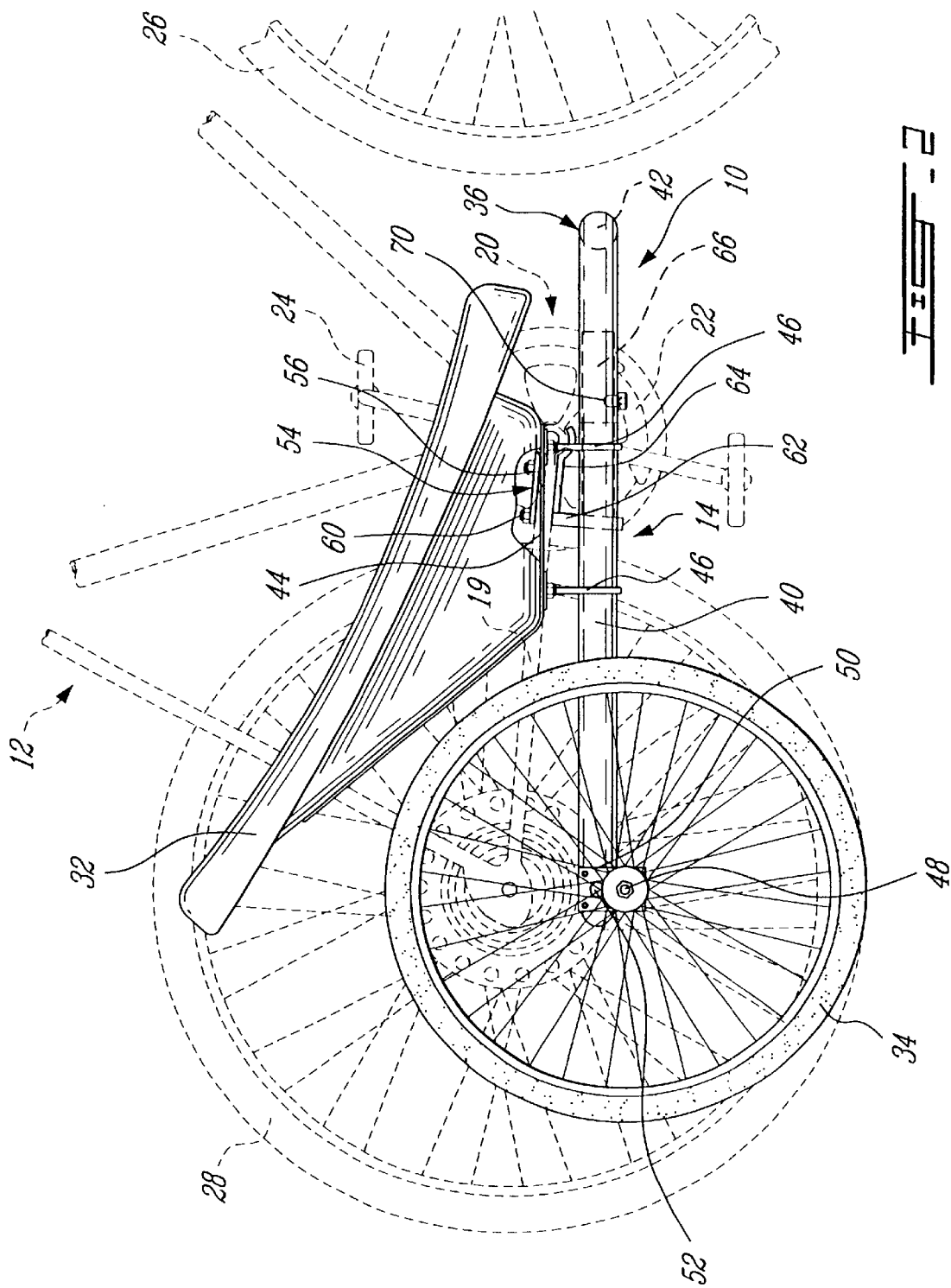
FIG. 2 is a side elevational view of the sidecar and bicycle of FIG. 1.

As seen in FIG. 2, the seat 32 is mounted on a support plate 44 having an undersurface on which a pair of spaced-apart parallel transversal members 46 are screwed. The transversal members 46 are welded to the linear portion 40 of the structural member 36 in order to secure the seat 32 thereto.

The wheel 34 has an axle 48 which is journaled in a block 50 secured to the rear end of the structural member 36 via a number of threaded fasteners 52.

Figure 3:
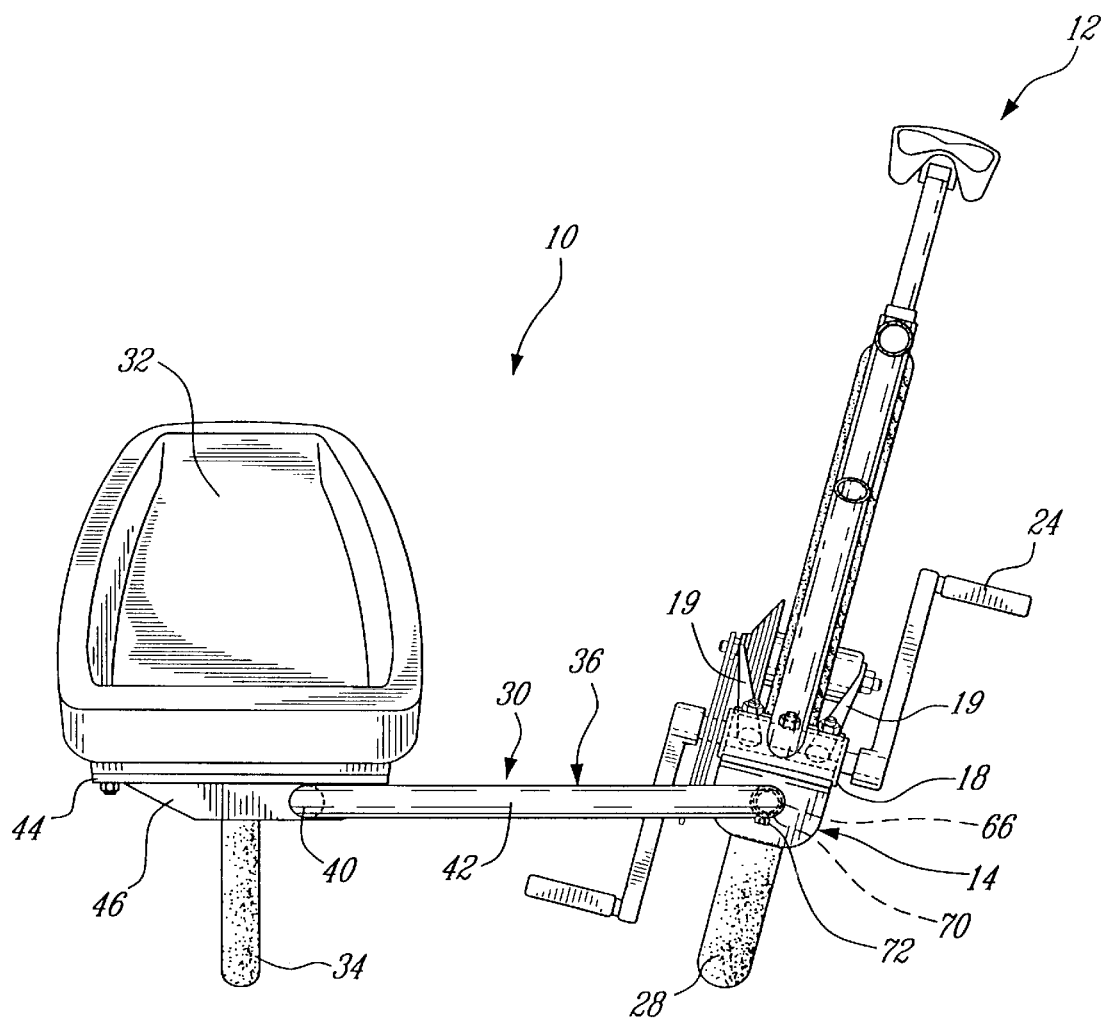
FIG. 3 is a front elevational view of the sidecar with the bicycle leaned at an angle from the vertical on a side opposed to the sidecar, the front portion of the bicycle being omitted for clarity purposes.
Figure 4:
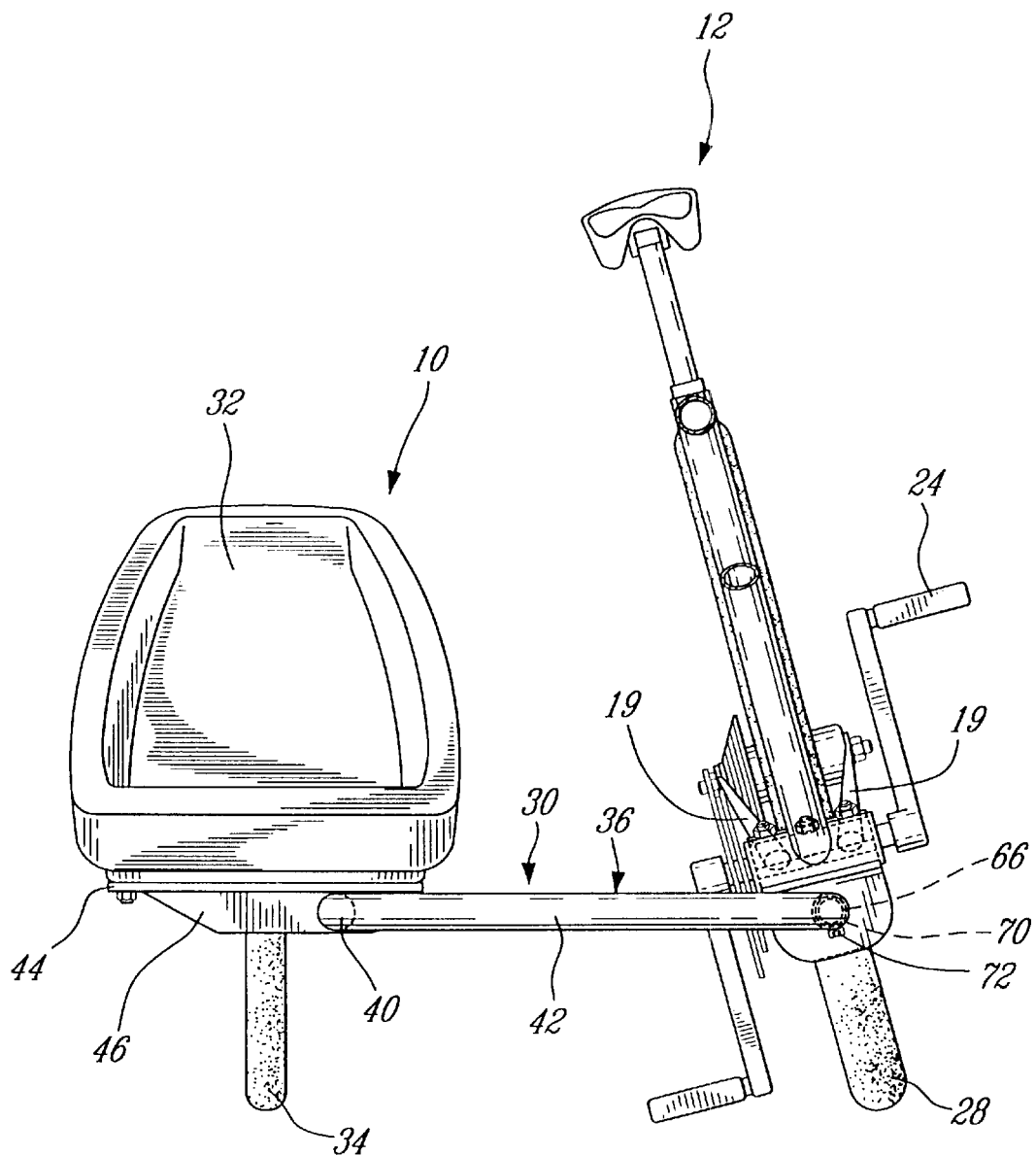
FIG. 4 is a front elevational view of the sidecar with the bicycle leaned at an angle from the vertical towards the sidecar, the front portion of the bicycle being omitted for clarity.

As seen in FIGS. 3 and 4, the connection between the sidecar 10 and the bicycle 12 enables the cyclist to lean the bicycle 12 on either side between first and second limits positions, without affecting the position of the sidecar 10.

More specifically, as seen in FIGS. 5 and 6, the coupling 14 includes a bracket 54 which is detachably securable between the chain stays 19 of the bicycle frame 16. The bracket 54 includes a top member 56 adapted to be seated on the chain stays 19 and a bottom member 58 adapted to be held against the undersurface of the chain stays 19 and the bottom axle housing 18. A number of threaded fasteners 60 are provided to retain and draw the top and bottom members 56 and 58 towards each other against the chain stays 19 so as to rigidly attach the bracket 54 to the bicycle frame 16. The bracket 54 can be readily removed from the bicycle frame by unscrewing the threaded fasteners 60 so as to disconnect the bottom member 58 from the top member 56. According to the illustrated embodiment, the top member 56 is provided in the form of a single plate, whereas the bottom member 58 is provided in the form of a pair of perpendicular plates 62 and 64 welded together.

As seen in FIGS. 2 and 5, an axle 66 extends forwardly from the plate 62 just below the plate 64 to a position in front of the bottom axle housing 18. The axle 66 is disposed so as to be coaxial with the central longitudinal axis of the bicycle frame 16. The proximal end of the axle 66 is secured to the plate 62 as by welding. Furthermore, the axle 66 can be welded, such as at 68, to the undersurface of the plate 64 in order to increase the bearing capacities of the axle 66. In the illustrated embodiment, the axle 66 has a tubular body.

As seen in FIG. 5, the linear portion 38 of the tubular structural member 36 is dimensioned to be slidably fitted over the distal end portion of the axle 66. A circumferential slot 70 is defined in the linear portion 38 of the structural member 36 for receiving a pin 72 adapted to be rigidly connected to the axle 66 so as to prevent axial removal of the structural member 36 from the axle 66, while at the same time allowing limited relative rotational movements therebetween. As depicted by arrow 74 in FIG. 6, the pin 72 will be constrained to move within the circumferential slot 70 between opposed limits positions 72' and 72" in response to the tilting of the bicycle frame 16 from the vertical. It is noted that the pin 72 will be disposed midway between the opposed ends of the circumferential slot 70 when the bicycle will stand upright. Accordingly, the sideways tilling of the bicycle frame 16 will be equally limited on either side from the vertical by the opposed ends of the circumferential slots 70.

The pin 72 can be threadably engageable with the axle 66 or otherwise releasably secured thereto.

As seen in FIGS. 1 and 2, the first linear portion 38 of the structural member 36 is dimensioned to extend forwardly in front of the bottom axle housing 18 behind the front wheel 26 at a sufficient distance to ensure that the laterally bent portion 42, which extends laterally from the first linear portion 38, will not interfere with the path defined by the pedals 24 when operated to propel the bicycle 12. The second linear portion 40 of the structural member 36 extends rearwardly from the laterally bent portion 42 along one side of the bicycle 12. The lateral spacing between the second linear portion 40 and the bicycle frame 16 is determined by the length of the laterally bent portion 42 interconnecting the first and second linear portions 38 and 40 to one another.

One major advantage of the present invention resides in the fact that the sidecar 10 can be easily and quickly coupled to the bicycle frame 16 by first slidably fitting the linear portion 38 of the structural member 36 over the axle 66 to a position where the circumferential slot 70 is in register with a threaded radial bore (not shown) defined through the axle 66, and second threadably engaging the pin 72 within the threaded radial bore. To disconnect the sidecar 10 from the bicycle 12, one only has to disengage the pin 72 from the axle 66 and axially withdraw the structural member 36 from the axle 66.

Furthermore, the present invention is simple and economical to manufacture.

According to a second embodiment of the present invention which is not illustrated, the laterally bent portion 42 could extend rearwardly in diagonal with respect to the longitudinal axis of the bicycle 12 and the seat 32 could be mounted centrally thereon, thereby eliminating the need of having transversal members 46 for securing the seat 32 on the structural member 36. Furthermore, the wheel 34 could be selectively mounted on either side of the rear end of the linear portion 40 of the structural member 36 so as to be centrally or laterally disposed relative to the seat 32 depending on the weight of the child to be carried.

According to a further embodiment of the present invention, a pair of circumferentially spaced-apart stoppers (not shown) could be provided on the axle 66 at a proximal end portion thereof to receive therebetween a projection (not shown) extending from the free end of the linear portion 38 of the structural member 36. The stoppers would cooperate with the projection to limit relative rotational movement between the structural member 36 and the axle 66.

Figure 7:
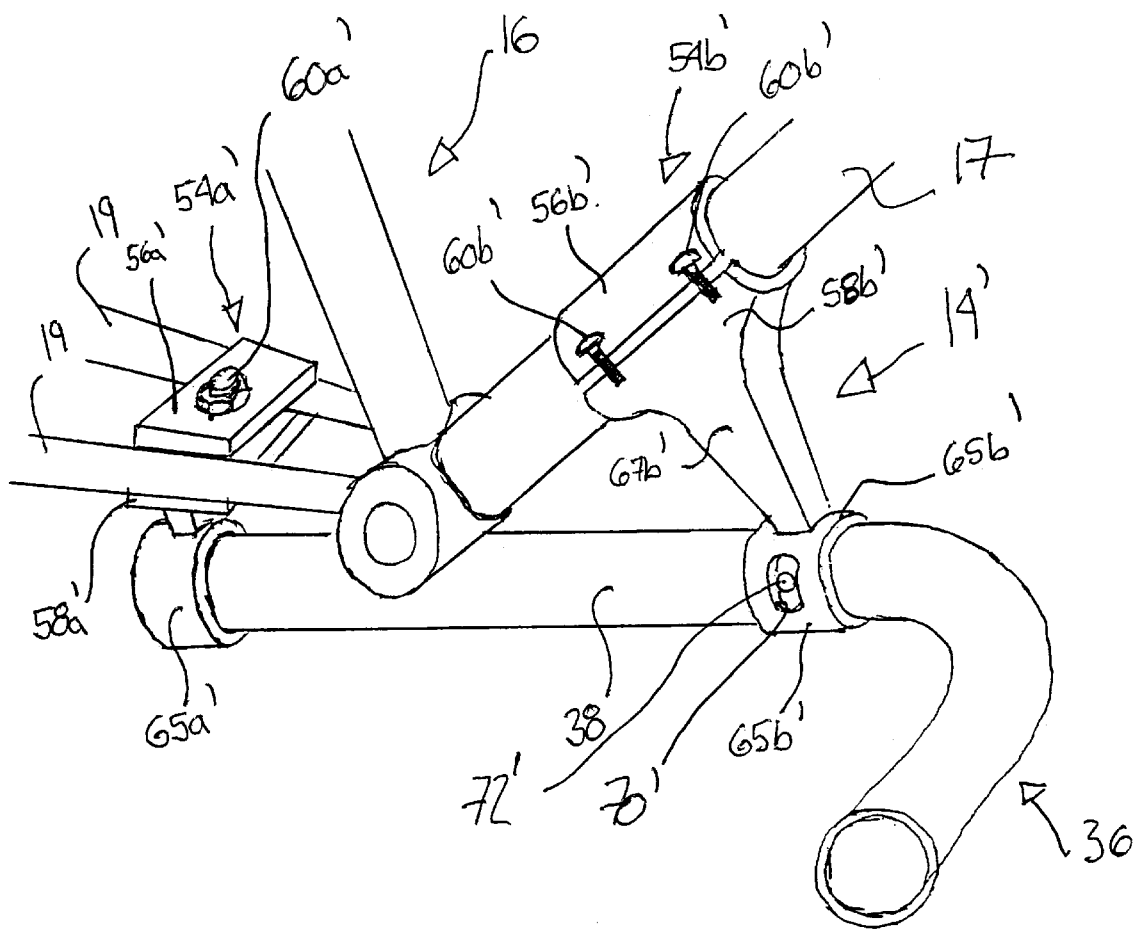
FIG. 7 is an enlarged fragmentary perspective view of a second embodiment of a coupling used to releasably secure the sidecar to the bicycle.

FIG. 7 illustrates a second construction of a coupling used to releasably attach the sidecar to the bicycle frame 16. The coupling 14' comprises a pair of brackets 54a' and 54b' respectively detachably securable between the chain stays 19 of the bicycle frame 16 and the diagonal 17 thereof.

The bracket 54a' includes a top member 56a' adapted to be seated on the chain stays 19 and a bottom member 58a' adapted to be held against the undersurface of the chain stays 19. A threaded fastener 60a' is provided to retain and draw the top and bottom members 56a' and 58a' towards each other against the chain stays 19 so as to rigidly attach the bracket 54a' to the bicycle frame 16. The bracket 54a' further includes a cylindrical sleeve 65a' depending from the bottom member 58a' for slidably receiving the distal end of the linear portion 38 of the structural member 36.

The bracket 54b' includes a top semi-cylindrical member 56b' adapted to be seated on the diagonal 17 and a bottom semi-cylindrical member 58b' adapted to be held against the undersurface of the diagonal 11 at a selected location therealong. A number of threaded fastener 60b' are provided to retain and draw the top and bottom members 56b' and 58b' towards each other against the diagonal 17 so as to rigidly attach the bracket 54b' to the bicycle frame 16. The bracket 54b' further includes a leg 67b' extending integrally from the bottom member 58b' and having a cylindrical sleeve 65b' formed at a distal end thereof for alignment with the cylindrical sleeve 65a' to form therewith a passage having a connecting axis for slidably receiving the linear portion 38 of the structural member 36. A circumferential slot 70' is defined in the cylindrical sleeve 65b' for receiving a pin 72' adapted to be releasably rigidly connected to the linear portion 38 of the structural member 36 so as to prevent axial removal of the structural member 36 from the sleeves 65a' and 65b' while allowing limited relative rotational movements therebetween.

The coupling 14' has the advantage of being adaptable to a large variety of bicycle. A further advantage of the coupling 14' is its degree of adjustment relative to the frame 16, thereby allowing to vary the axial position of the sidecar with respect to the bicycle frame 16.

What is claimed is:

1. A sidecar in combination with a bicycle having a bicycle frame extending in a plane and defining a bottom axle housing for supporting a power train, including a chain sprocket and a pair of pedals said sidecar comprising a wheeled frame adapted to extend on one side of the bicycle, a seat provided on said wheeled frame, and a coupling for attaching said wheeled frame to a bottom portion of the bicycle frame while allowing relative pivotal movements of the bicycle frame relative to said wheeled frame about a longitudinal axis of the bicycle, said coupling including a first part which is fixed relative to the bicycle frame and a second part which is fixed relative to said wheeled frame, said first and second parts being rotatably interconnectable to form with said wheeled frame a system having one degree of freedom, wherein said wheeled frame extends forwardly from said coupling in front of the bottom axle housing behind a front wheel of the bicycle and then laterally to clear a path defined by the pedals when operated to propel the bicycle.

2. A combination as defined in claim 1, wherein said first and second parts are adapted to be slidably interfitted one over another for allowing limited relative rotational movements therebetween.

3. A combination as defined in claim 2, wherein a circumferential slot is defined in one of said first and second parts for receiving a pin rigidly mounted to another one of said first and second parts, said pin and said circumferential slot cooperating to prevent axial disengagement of said first and second parts while allowing limited relative rotational movements therebetween.

4. A combination as defined in claim 3, wherein said second part includes a tubular body dimensioned to be slidably fitted over said first part, and wherein said circumferential slot is defined in said tubular body.

5. A combination as defined in claim 4, wherein said pin is detachably securable to said first part.

6. A combination as defined in claim 4, wherein said first part is detachably secured to the bicycle frame in proximity of the power train, and wherein said first part has an elongated member extending forwardly of the bottom axle housing, said elongated body being substantially in the plane of the bicycle.

7. A combination as defined in claim 6, wherein said elongated member extends underneath of the bottom axle housing.

8. A combination as defined in claim 3, wherein said wheeled frame includes a single tubular structural member having first, second and third successive portions, said first portion extending in parallel to the plane of the bicycle on one side thereof, said second portion extending laterally from a forward end of said first portion towards the plane of the bicycle, and said third portion extending rearwardly from the second portion in the plane of the bicycle for engagement with said first part.

9. A combination as defined in claim 8, wherein said second part of said coupling is integral to a free end of said third portion of said tubular structural member.

10. A combination as defined in claim 9, wherein said tubular structural member has a generally U-shaped configuration.

11. A combination as defined in claim 10, wherein a wheel is journaled at a free end of said first portion of said tubular structural member, and wherein said seat is centrally mounted over said wheel.

12. A combination as defined in claim 1, wherein said coupling constitutes a sole point of attachment of said wheeled frame to said bicycle frame.

13. A combination as defined in claim 1, wherein said first and second parts are slidably engageable along a connecting axis parallel to a longitudinal axis of the bicycle.

14. A combination as defined in claim 13, wherein a circumferential slot is defined in one of said first and second parts for receiving a pin rigidly mounted to another one of said first and second parts, said pin and said circumferential slot cooperating to prevent axial disengagement of said first and second parts while allowing limited relative rotational movements therebetween.

15. A combination as defined in claim 14, wherein said first part defines a passage concentrically disposed relative to said connecting axis for receiving said second part.

16. A combination as defined in claim 15, wherein said passage extends forwardly of said bottom axle housing.

17. A combination as defined in claim 16, wherein said wheeled frame includes a structural member having first, second and third successive portions, said first portion extending in parallel to the plane of the bicycle on one side thereof, said second portion extending laterally from a forward end of said first portion towards the plane of the bicycle, and said third portion extending rearwardly from the second portion in the plane of the bicycle, said second part being provided at a distal end portion of said third part.

18. A combination as defined in claim 17, wherein said first part includes first and second brackets detachably securable to the bicycle frame, said first and second brackets being provided with respective cylindrical sleeves adapted to be concentrically placed relative to said connecting axis for slidably receiving said second part.

\* \* \* \* \*